(12) United States Patent
Spath et al.

(10) Patent No.: US 7,709,051 B2
(45) Date of Patent: May 4, 2010

(54) METHOD AND APPARATUS FOR DYEING A LAYER OF NANOCRYSTALLINE MATERIAL

(75) Inventors: Martin Spath, Zuid-Scharwoude (NL); Nicolaas Petrus Gijsbertus Van Der Burg, Velserbroek (NL); Danny Roberto Mahieu, Den Helder (NL); Paul Matthieu Sommeling, Leiden (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 1394 days.

(21) Appl. No.: 10/514,508

(22) PCT Filed: May 21, 2003

(86) PCT No.: PCT/NL03/00375

§ 371 (c)(1),
(2), (4) Date: May 10, 2005

(87) PCT Pub. No.: WO03/102985

PCT Pub. Date: Dec. 11, 2003

(65) Prior Publication Data

US 2006/0107471 A1     May 25, 2006

(30) Foreign Application Priority Data

Jun. 4, 2002   (NL) .................................. 1020748

(51) Int. Cl.
*B05D 5/12* (2006.01)
(52) U.S. Cl. .......................... 427/74; 136/263; 118/500
(58) Field of Classification Search ................. 136/263; 430/60, 61, 62; 118/506, 641, 642, 500; 427/74
See application file for complete search history.

(56) References Cited

U.S. PATENT DOCUMENTS

| 4,821,675 A | * | 4/1989 | Ikeno et al. ................. 118/667 |
| 5,350,644 A |   | 9/1994 | Graetzel et al. ............. 429/111 |
| 6,063,199 A | * | 5/2000 | Sajoto et al. ................ 118/715 |

(Continued)

FOREIGN PATENT DOCUMENTS

WO    WO 96/29716    9/1996

(Continued)

OTHER PUBLICATIONS

Patent Abstracts of Japan, vol. 2000, No. 15, Apr. 6, 2001 & JP 2000 348783 A (Nikon Corp), Dec. 15, 2000 abstract.

(Continued)

*Primary Examiner*—Nam X Nguyen
*Assistant Examiner*—Luan V Van
(74) *Attorney, Agent, or Firm*—Paul, Hastings, Janofsky & Walker LLP

(57) ABSTRACT

Method for dyeing a layer of a nanocrystalline material on a substrate using a liquid dye, comprising the successive steps of (i) providing said layer on a substrate, (ii) providing an apparatus for dyeing said layer, which apparatus comprises at least a supply container for the liquid dye, a closable substrate holder provided with at least one inlet and at least one outlet for a substrate provided with a layer of nanocrystalline material, and conduit and circulation means for causing the liquid dye to circulate through the supply container and the substrate holder, (iii) placing the substrate with said layer in the substrate holder and closing the substrate holder, and providing a liquid dye in the supply container, and (iv) causing the liquid dye from the supply container to circulate for a determined time through the substrate holder, and apparatus for performing this method.

6 Claims, 2 Drawing Sheets

U.S. PATENT DOCUMENTS

Figure 1:
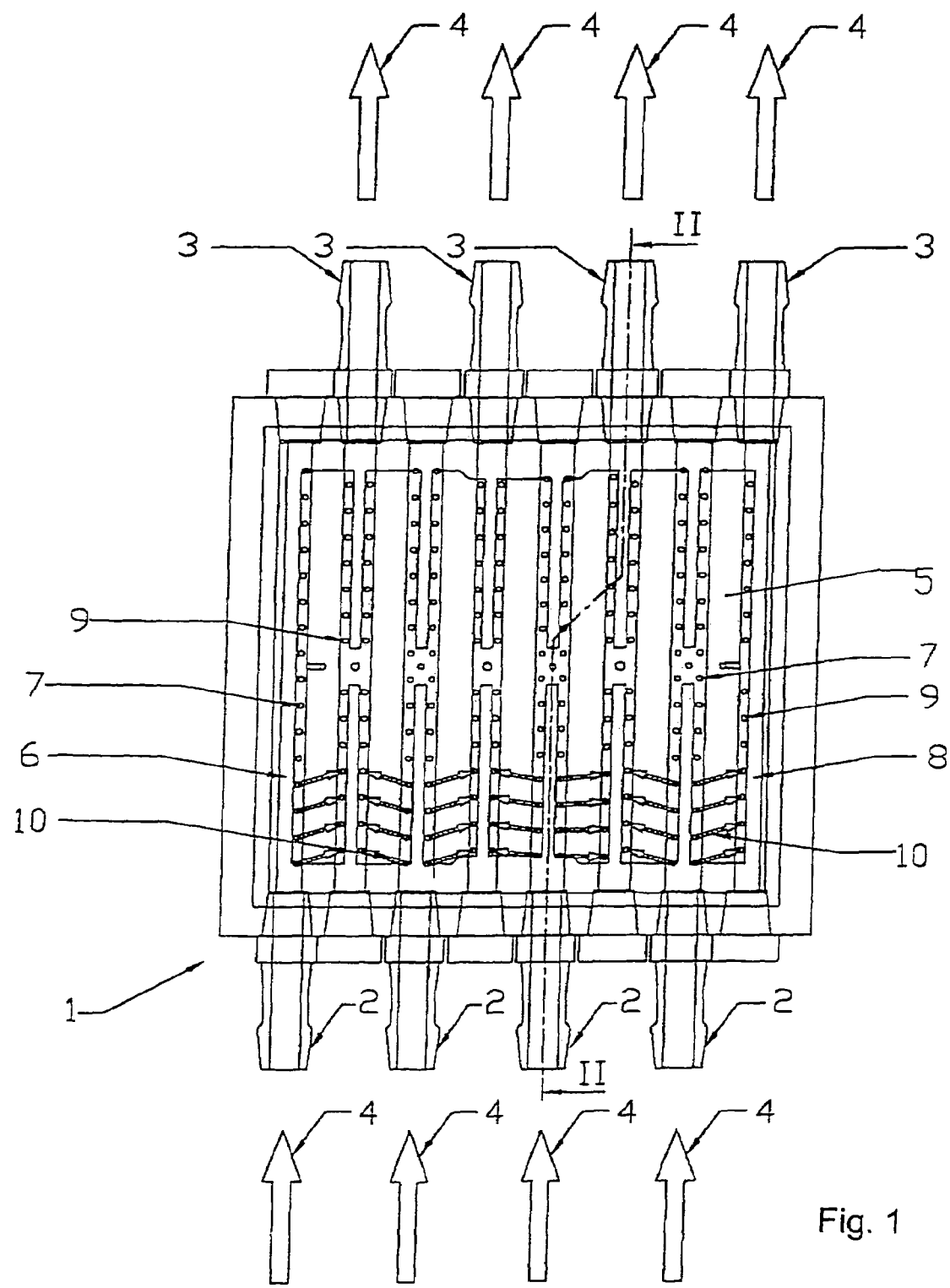

| | | | | |
|---|---|---|---|---|
| 2001/0004901 A1* | 6/2001 | Yamanaka et al. | ......... | 136/263 |
| 2001/0007704 A1* | 7/2001 | Anzai et al. | ............... | 428/64.7 |
| 2002/0020358 A1* | 2/2002 | Hey et al. | .................. | 118/725 |
| 2003/0007240 A1* | 1/2003 | Blum et al. | ............... | 359/319 |

OTHER PUBLICATIONS

Sorensen B et al: "Industrial Development of Photoelectrochemical Modules" New Materials for Electrochemical Systems IV. Extended Abstracts of the Fourth International Symposium on New Materials for Electrochemical Systems, Proceedings of Fourth International Symposium on New Materials for Electrochemical Systems, Montreal,, pp. 415-416, XP008013294 2001, Montreal, Que. Canada, Ecole Polytechnique De Montreal, Canada, the whole document.

* cited by examiner

METHOD AND APPARATUS FOR DYEING A LAYER OF NANOCRYSTALLINE MATERIAL

The invention relates to a method for dyeing a layer of a nanocrystalline material on a substrate using a liquid dye.

An example of a layer of nanocrystalline material on a substrate is the work electrode of a liquid-containing photovoltaic element.

A liquid-containing photovoltaic element is known from the U.S Pat. No. 5,350,644. The known photovoltaic element comprises a work electrode which is formed by a layered structure of at least a first electrically conductive layer which is for instance deposited on a first substrate, or even forms a first substrate, a layer of nanocrystalline metal oxide semiconductor material deposited on the first electrically conductive layer, a counter-electrode which is formed by a transparent second electrically conductive layer deposited on a transparent second substrate, and an electrolytic liquid contained between the layer of semiconductor material and the second electrically conductive layer. In practical situations use is usually made of a glass plate for the first and second substrate. The nanocrystalline metal oxide semiconductor material is dyed with an organic dye which sensitizes the semiconductor material to light incident upon the photovoltaic element in order to cause a photovoltaic effect in the element with this incident light, resulting in the creation of a negative and a positive electrical charge carrier (respectively an electron and a hole).

During manufacture of a work electrode it has to be dyed with the organic dye.

In the prior art the dyeing takes place as desired in batches or one by one, but in both cases manually. Here the surface of a work electrode is successively brought into contact with the organic dye, heated and rinsed with an ethanol and dried.

Manual dyeing of work electrodes has the drawback of being laborious, time-consuming and expensive. It is moreover difficult during manual dyeing to control the process parameters, such as dye concentration, process temperature and duration of the dyeing process.

It is an object of the invention to provide a method according to which a layer of a nanocrystalline material on a substrate, and in particular a work electrode, can be dyed in a short time.

A further object is to provide a method according to which the process parameters important for the dyeing process are adjustable in reproducible manner within predetermined tolerances.

These objectives are achieved with a method of the type stated in the preamble which according to the invention comprises the successive steps of (i) providing said layer on a substrate, (ii) providing an apparatus for dyeing said layer, which apparatus comprises at least a supply container for the liquid dye, a closable substrate holder provided with at least one inlet and at least one outlet for a substrate provided with a layer of nanocrystalline material, and conduit and circulation means for causing the liquid dye to circulate through the supply container and the substrate holder, (iii) placing the substrate with said layer in the substrate holder and closing the substrate holder, and providing a liquid dye in the supply container and (iv) causing the liquid dye from the supply container to circulate for a determined time through the substrate holder.

The substrate holder to be provided in the second step (ii) is preferably provided with heating means, and in the fourth step (iv) the substrate and the liquid dye are heated during circulation of the liquid dye using these heating means.

The adhesion of the liquid dye to the nanocrystalline material is enhanced by heating the liquid dye and the substrate.

In a method according to the invention the liquid dye is preferably set into turbulence in the substrate holder during performing of the fourth step (iv) so that the liquid dye is brought into contact in the shortest possible time with the whole surface of the nanocrystalline material to be dyed, and the process time is thus kept as short as possible.

The invention further relates to an apparatus for performing the above described method, which apparatus according to the invention comprises a supply container for a liquid dye, a closable substrate holder provided with at least one inlet and at least one outlet for a substrate provided with a layer of nanocrystalline material, and conduit and circulation means for causing the liquid dye from the supply container to circulate through the substrate holder.

In a practically advantageous embodiment the substrate holder in an apparatus according to the invention comprises a platform for placing the substrate thereon, which platform is provided with at least one inlet channel which co-acts with the inlet and which is provided with outflow openings directed at a substrate placed on the platform and with at least one outlet channel which co-acts with the outlet and which is provided with inflow openings.

In this latter embodiment the platform is manufactured for instance from a chemically inert plastic material, preferably from polytetrafluoroethylene (PTFE).

The substrate holder is preferably provided with heating means for heating a substrate placed in the substrate holder and liquid dye circulating through this holder.

In one embodiment such heating means comprise an inductive element.

In another embodiment such heating means comprise a resistor element which is manufactured for instance from a transparent conducting oxide (TCO) which is arranged on a plate which in the operating situation extends above a substrate placed in the substrate holder.

The invention is elucidated hereinbelow on the basis of an embodiment of an apparatus, with reference to the drawings.

In the drawings

Figure 2:
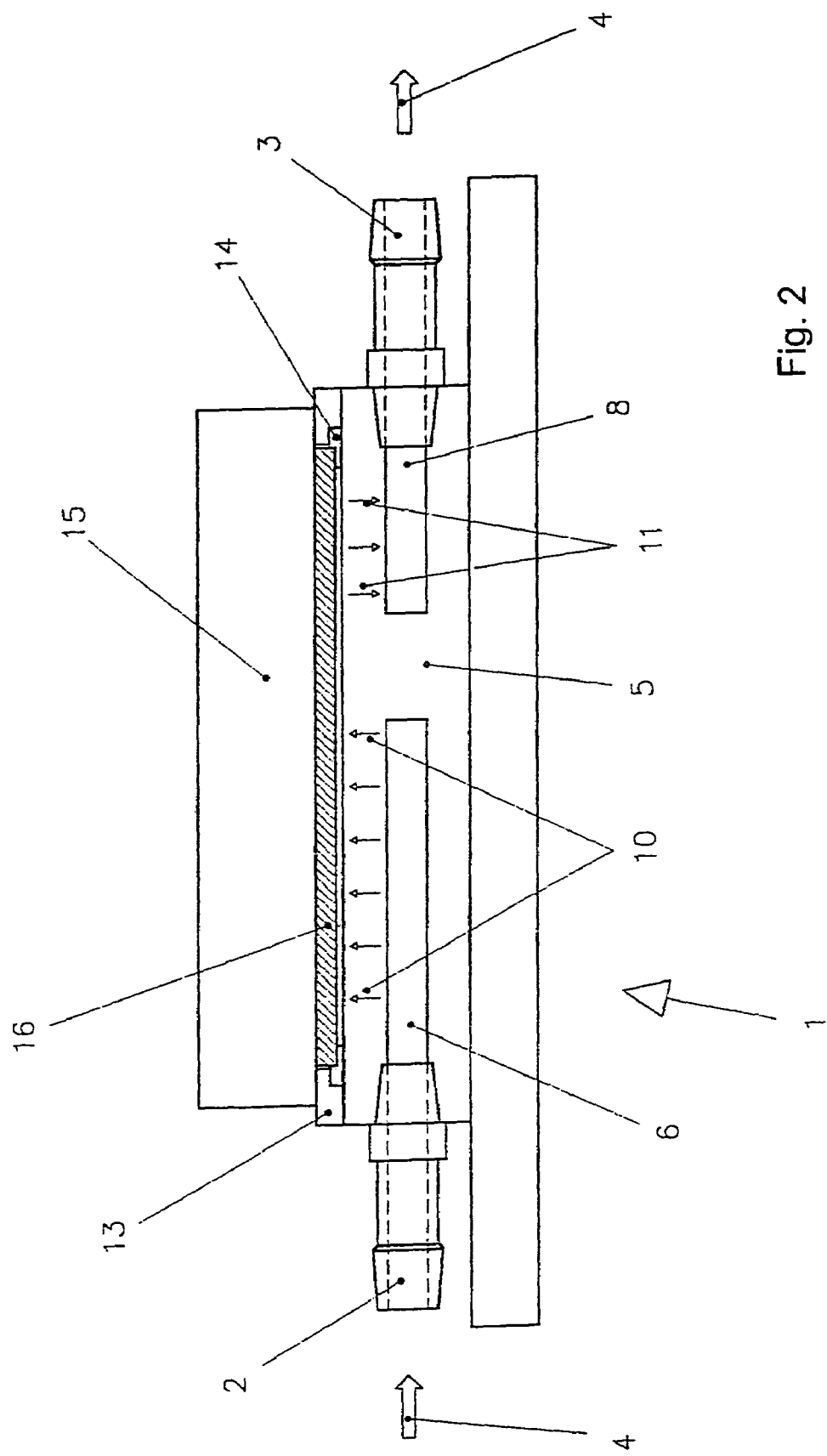

FIG. 1 shows a top view of an embodiment of a substrate holder for an apparatus for dyeing a work electrode for a solar cell, and FIG. 2 is a vertical cross-section through the substrate holder shown in FIG. 1 along the line II-II.

Corresponding components are designated in the drawings with the same reference numerals.

FIG. 1 shows a substrate holder 1 provided with inlets 2 and outlets 3 which are connected via a circulation line (not shown) to a supply container (not shown) for a liquid dye which, using a pump (not shown), can be set into circulation in the direction of arrows 4 through substrate holder 1 and the supply container. Laid into substrate holder 1 is a plate which forms a platform 5 on which a substrate can be laid, which platform 5 is provided with respective inlet channels 6 which are connected onto inlets 2 and which are provided with outflow openings 7 which are directed at a substrate placed on platform 5 and out of which liquid dye can flow (indicated symbolically by arrows 10), and with respective outlet channels 8 which are connected onto outlets 3 and which are provided with inflow openings 9.

FIG. 2 shows substrate holder 1 in a vertical cross-section along the line II-II in FIG. 1, with, in addition to the already described components, a heating plate 15 which is provided on its underside with a spacer ring 13 with a seal 14 of a suitable silicone material. Arranged in heating plate 15 is a resistive film of a transparent conducting oxide (TCO), provided with electrical connections (not shown). In the operating situation the heating plate 15 is pressed using a pneumatic pressing element (not shown) onto a work electrode 16, of which the layer of nanocrystalline material for dyeing is directed downward, and of which a peripheral edge not covered with nanocrystalline material rests on seal 14 with which the work electrode is sealed onto the platform 5. During the dyeing liquid dye, which is preferably preheated to a temperature of for instance 60° C., flows via inlets 2, inlet channels 6 and outflow openings 7 as according to arrows 10 against the work electrode 16, which is heated to a temperature of a maximum of 60° C. using heating plate 15.

The invention claimed is:

1. Method for dyeing a layer of a nanocrystalline material on a substrate using a liquid dye, comprising the successive steps of
   (i) providing said layer on a substrate;
   (ii) providing an apparatus for dyeing said layer, which apparatus comprises at least a supply container for the liquid dye, a closable substrate holder for a substrate provided with a layer of nanocrystalline material, the substrate holder being provided with at least one inlet and at least one outlet being connected via a circulation line to the supply container, which apparatus further comprises conduit and circulation means for causing the liquid dye to circulate through the supply container and the substrate holder and to flow against the layer of nanocrystalline material;
   (iii) placing the substrate with said layer in the substrate holder and closing the substrate holder, and providing a liquid dye in the supply container; and
   (iv) causing the liquid dye from the supply container to circulate for a determined time through the substrate holder and to flow against the layer of nanocrystalline material.

2. Method as claimed in claim 1, wherein in the second step (ii) an apparatus is provided which comprises a substrate holder which is provided with heating means, and in the fourth step (iv) the substrate and the liquid dye are heated during circulation of the liquid dye using said heating means.

3. Method as claimed in claim 1, wherein the liquid dye is set into turbulence in the substrate holder during performing of the fourth step (iv).

4. Method for dyeing a layer of a nanocrystalline material on a substrate using a liquid dye, comprising:
   providing said layer on a substrate;
   providing an apparatus for dyeing said layer, which apparatus comprises at least a supply container for the liquid dye, a closable substrate holder for a substrate provided with a layer of nanocrystalline material, the substrate holder being provided with at least one inlet enabling the liquid dye to flow against the substrate from a plurality of openings, and at least one outlet, the inlet and the outlet being connected via a circulation line to the supply container, which apparatus father comprises conduit and circulation means for causing the liquid dye to circulate through the supply container and the substrate holder and to flow against the layer of nanocrystalline material;
   placing the substrate with said layer in the substrate holder and closing the substrate holder, and providing a liquid dye in the supply container; and
   causing the liquid dye from the supply container to circulate for a determined time through the substrate holder and to flow against the layer of nanocrystalline material.

5. Method as claimed in claim 4, wherein providing an apparatus comprises providing an apparatus which comprises a substrate holder which is provided with heating means, and wherein causing the liquid to circulate comprises heating the substrate and the liquid dye during circulation of the liquid dye using said heating means.

6. Method as claimed in claim 4, wherein the liquid dye is set into turbulence in the substrate holder during the causing of the liquid dye to circulate.

\* \* \* \* \*